Nov. 25, 1930.      A. FAY ET AL      1,782,680
HOSE OR PIPE CLAMP
Filed Oct. 24, 1927      2 Sheets-Sheet 1
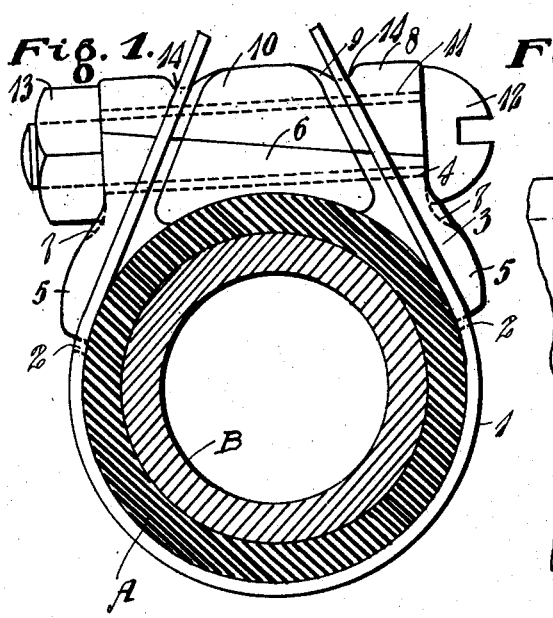
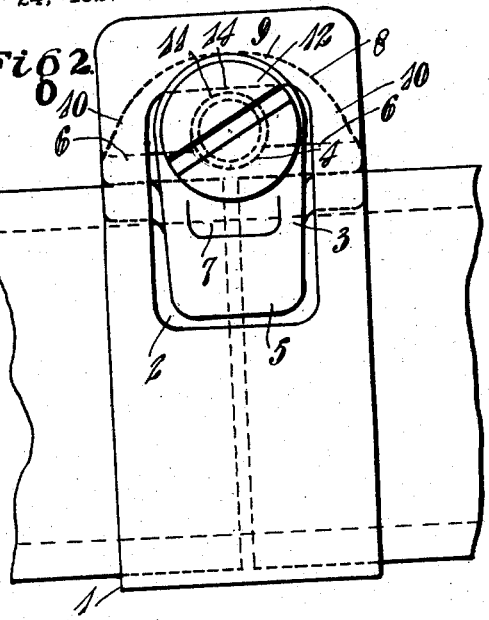
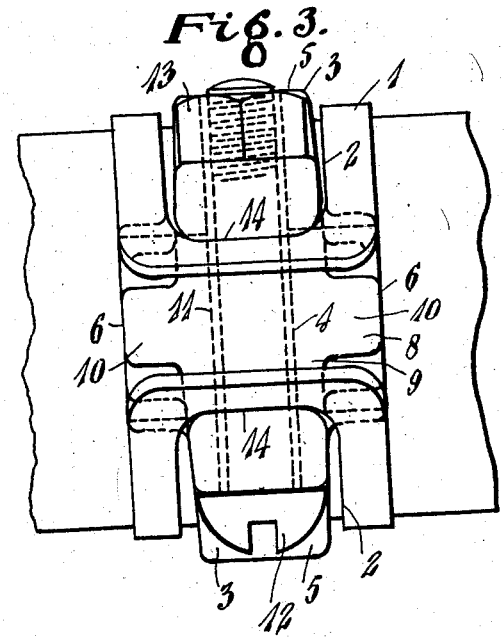
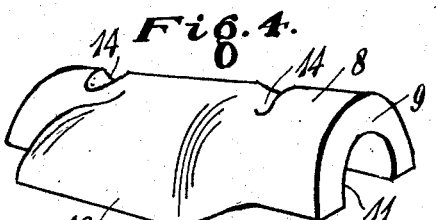
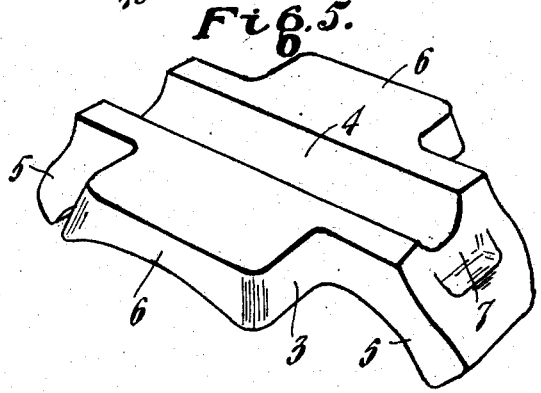
INVENTOR.
Alpheus Fay
BY John L. Zehnder
Clarence Tender
ATTORNEY.

Nov. 25, 1930.   A. FAY ET AL   1,782,680
HOSE OR PIPE CLAMP
Filed Oct. 24, 1927   2 Sheets-Sheet 2
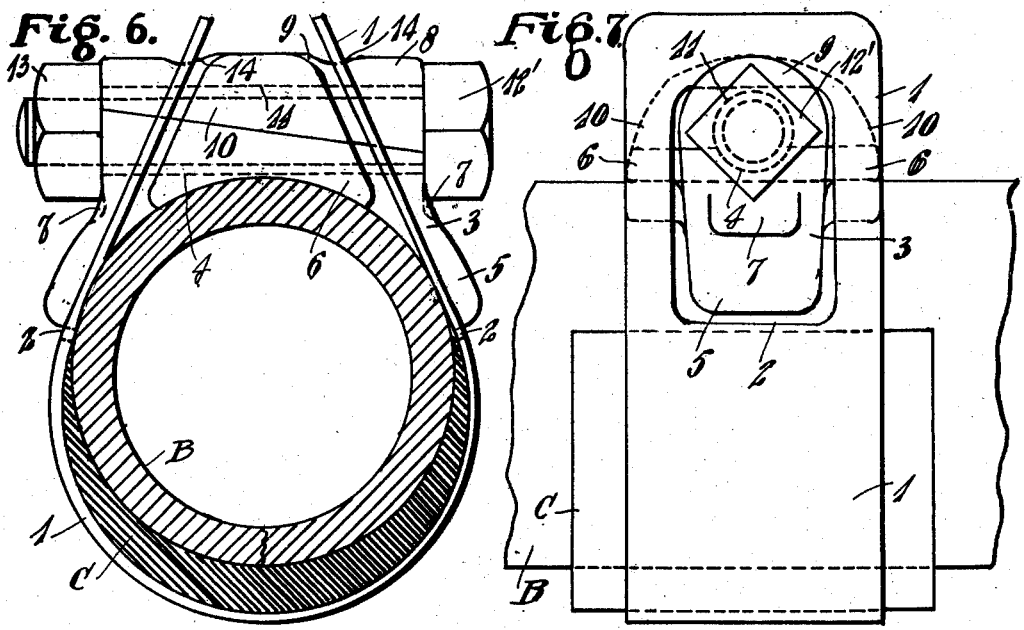
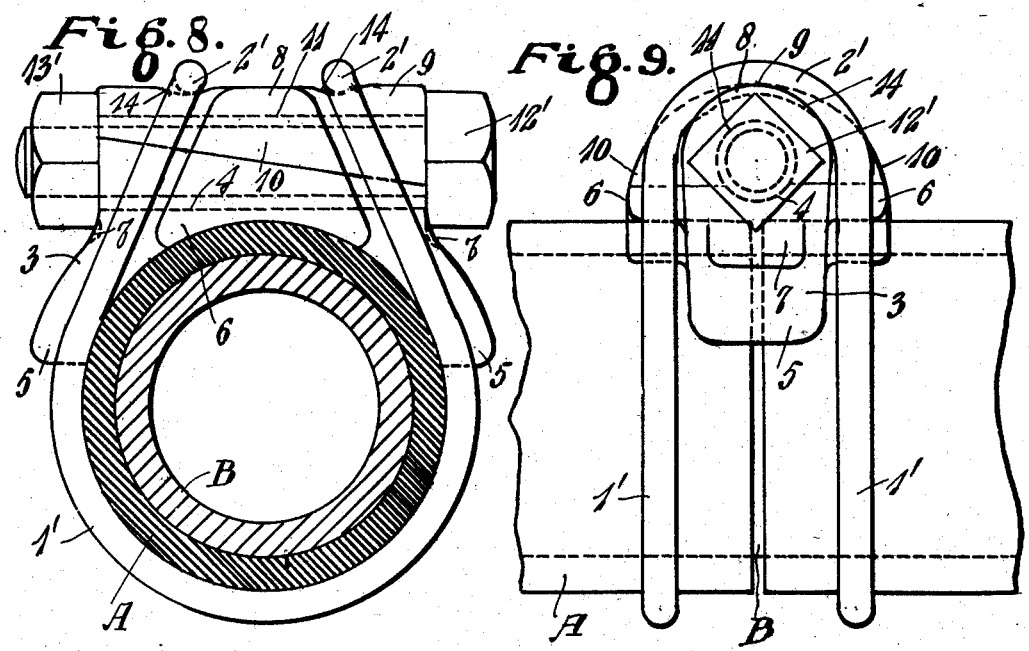
INVENTOR.
Alpheus Fay
BY John L. Zellnder
Clarence Pardew
ATTORNEY.

Patented Nov. 25, 1930

1,782,680

UNITED STATES PATENT OFFICE

ALPHEUS FAY AND JOHN L. ZEHNDER, OF LOUISVILLE, KENTUCKY

HOSE OR PIPE CLAMP

Application filed October 24, 1927. Serial No. 228,418.

Our invention relates to hose clamps and the like; and its object is to provide a more substantial and effective device of this character, which may be manufactured at a cost approximating that of the ordinary clamps. Other objects will appear in the course of the following description.

We attain these objects by the device illustrated, for example, in the accompanying drawings, in which—

Figure 1 is a side elevation of a clamp embodying our invention, applied to a hose-and-pipe connection, the hose and pipe being in cross section;

Fig. 2 is an end elevation of the same, with the hose and pipe in side elevation;

Fig. 3 is a plan view of the same;

Fig. 4 is a detail perspective view of the top wedge part;

Fig. 5 is a similar view of the bottom wedge part;

Fig. 6 is a view similar to Fig. 1, showing the clamp applied to a pipe and a patch therefor;

Fig. 7 is an end elevation of the same;

Fig. 8 is a view similar to Fig. 1, showing a modification of the loop member; and Fig. 9 is an end elevation of the same.

In the example of Figs. 1 to 7, inclusive, the clamp comprises a loop member 1 made of a strip of sheet metal having oblong slots 2 near its ends. This strip is bent around the hose A and pipe B (Figs. 1, 2 and 3) or the pipe B and patch C (Figs. 6 and 7) with its slotted ends inclining toward each other at one side of the hose or pipe. The bottom wedge part 3 consists of an elongated middle part having a channel 4 of semi-circular cross-section throughout its length, with end extensions 5 downwardly, which extensions and the bottom of the middle part are curved to fit the hose or pipe like a saddle. The middle part also has lateral extensions 6 similarly curved on their lower sides. The top of this part 3, throughout the middle part and lateral extensions 6, is inclined in a single plane, lengthwise of itself, or crosswise of the pipe or hose. The purpose of the lateral extensions 6 is to give the part 3 ample bearing against the pipe or hose, below, and for the upper wedge part, above, as well as to make this lower wedge part 3 amply strong; while the narrower end extensions 5 will slip easily through the slots 2 of the loop member 1. These extensions 5, up near the ends of the channel 4, are provided with recesses 7 to afford flat surfaces at right angles to the axis of the channel. The upper wedge part 8 consists of a middle part 9 of semicircular cross section, having lateral extensions 10; the underside of this member 8 being flat and inclined, with a channel 11 of semicircular cross-section throughout its length, to register with the channel 4 of the lower member 3, while the flat portions lie snugly on the flat portions of the lower member 3 and are co-extensive therewith. The ends of this upper member 8 are flat, at right angles to the axis of the channel 11, and come even with the corresponding portions in the recesses 7 of the lower member. The bolt 12 (Figs. 1, 2 and 3) is an ordinary stove bolt with a rounded slotted head, having a nut 13; or (Figs. 6 and 7) the bolt 12' may have a square head. In either case, the bolt 12 or 12' extends through the circular passage made by the registered channels 4 and 11, with the bolt head against the flat surfaces at one end and the nut 13 against the flat surfaces at the other end of the members 3 and 8.

In applying the clamp, the lower or saddle member 3 is placed astraddle of the hose or pipe as shown, with the upper member 8 thereon and the bolt 12 or 12', with its nut 13 screwed out thereon, through the registering channels 4 and 11; the nut being out far enough to allow the member 8 to slide down on the member 3 far enough to permit the loop member 1, passed around the pipe as before mentioned, to receive the narrow end portions of the members 3 and 8 through its slots 2. When the members 3 and 8 and member 1 have thus been brought together, the upper member 8 is slid up on the lower member 3 until the upper edges of the loop member slots 2 engage in the depressions 14, whereupon the nut 13 is screwed back on the bolt 12 or 12', further drawing the member 8 up along the member 3 until the entire device is very tightly clamped around the hose or pipe as shown.

In the example of Figs. 8 and 9, the wedge members 3 and 8 and their bolt 12' and nut 13 are the same as in Figs. 6 and 7; the difference being in the loop member 1' which, instead of being of sheet metal is of heavy wire bent into a link with welded ends, which link then is bent around the hose or pipe, as the hose A and pipe B, with the curved ends 2' of this link engaging in the depressions 14 of the upper wedge member 8. This kind of loop member is better adapted for making connection between two pieces of hose A than is the wide flat strip member 1 of the other example; because the wire side parts of the loop member 1' sink into the respective hose end parts with more concentrated clamping pressure. However, the strip member 1 of the preceding example is more easily made, since a strip of metal of the required width may be fed from a reel by suitable automatic feeding mechanism, to a press which punches the slots 2 and cuts off the completed members, which then only require bending to fit around the hose or pipe. The wedge members 3 and 8 are economically made as castings, ready for use without any machining whatever. The flat strip member 1 is better for holding a patch C as in Figs. 6 and 7, because the strip covers the thin edges c of the patch, whereas the wires of loop member 1' would allow these ends to gap away from the pipe and thus not effectively close the leak, as at the crack c' in the pipe B. It will be noted that, in either example, the downturned end parts 5 of the saddle member 3 extend around the hose or pipe far enough to lap over the line at which the loop member 1 or 1' begins to diverge from the hose or pipe at each side in extending up around the wedge members. We thus eliminate a place of leakage inevitably left, even with the best hose clamps heretofore in use, which have tongues to cover the regions between the ends of the loop member, but which cannot entirely cover these regions with such effectiveness as to entirely prevent leakage.

The drawings show a rather large clamp, but it will be understood that this clamp, of the same design, can be provided for the smallest hose, as for example small hose used for watering lawns and the like. It is with the view of making the device thus small that we provide the lateral extensions 6 and 10 for the members 3 and 8, respectively; enabling a comparatively narrow strip to be used for the loop member 1 without making the cast metal members 3 and 8 so small and weak as to be impractical. Larger clamps may be used for fire hose and the like, or still larger ones for patching large water mains or steam pipes temporarily, in the manner illustrated in Figs. 6 and 7. The patch may be rubber, leather (for oil or gas pipes) or metallic gasket or packing material (for steam or hot water mains) or any other material required according to the nature of the fluid that passes through the pipes. Our clamp is especially suitable for large heavy patching or coupling, on account of the extremely heavy clamping pressure that may be applied by the wedges drawn together by the bolt, and on account of the fact that, as no parts are distorted in this action and the bolt does not have to hold the loop member ends together by direct action, but holds indirectly through the advantageous intervention of the wedge members 3 and 8, the connection or patch is more dependable, the clamping device is more durable, and the work of tightening the clamp is less than with the commonly used clamps, wherein a bolt acts directly on the loop member ends and bends them out of shape in pulling them around the hose or pipe.

This clamp also is suited for clamping the air or steam hose to the pipes on railway cars, and for clamping the hose on automobiles where it connects with the radiator and with the engine jacket. In both of these cases, very large numbers of hose clamps are used; and our invention will afford greater security against leakage, and greater ease of removal and replacement of the hose, due to the advantages before pointed out. The stove bolt 12 is more adapted for very small hose clamps. The square-head bolt 12', or its equivalent, a hexagonal head bolt, is better for medium sized clamps, as for example the railway or motor car equipment referred to above; or wherever rusting of the bolt threads would make loosening with a screwdriver difficult. For greater security, a lock nut may be added, or the bolt ends may be burred over the nuts; these being details within the choice of the users. But in any case, the bolt will have less to hold than in the ordinary clamps where the bolt acts directly and not through the medium of the wedge.

Modifications other than those alluded to herein may occur, and while we have somewhat specifically described our invention, we do not wish to be understood as being limited to such precise description, but what we claim as new and desire to secure by Letters Patent is:

1. In a hose or pipe clamp, a loop member to extend around the hose or pipe, having engaging means near its ends at one side of the hose or pipe, threaded means, and wedging members wedged between said engaging means and the hose or pipe by operation of said threaded means.

2. In a hose or pipe clamp, a loop member to extend around the hose or pipe, having engaging means near its ends at one side of the hose or pipe, wedging members wedged between said engaging means and the hose or pipe, and means holding said members together in their wedging relation.

3. In a hose or pipe clamp, a loop member to extend around the hose or pipe, having engaging means near its ends at one side of the hose or pipe, a wedging member straddling the hose or pipe, threaded means, and a second wedging member wedged between the first wedging member and said engaging means by operation of said threaded means.

4. In a hose or pipe clamp, a loop member to extend around the hose or pipe, having engaging means near its ends at one side of the hose or pipe, a wedging member straddling the hose or pipe and having a channel, a second wedging member wedged between the first wedging member and said engaging means and having a channel registering with the channel of the first member, forming a passage, and a bolt extending through said passage and holding said members together in wedging relation.

5. In a hose or pipe clamp, a loop member to extend around the hose or pipe, having end parts composed of extensions from the opposite sides of the hose or pipe and a cross part connecting said extensions, a wedging member straddling the hose or pipe and comprising narrow end parts lapping partly around the hose or pipe between said loop member extensions and lateral parts extending along the hose or pipe between the end parts of the loop member, and a second wedging member wedged between the first mentioned member and the cross parts of the loop member.

6. In a hose or pipe clamp, a loop member to extend around the hose or pipe, having end parts each composed of extensions from the opposite sides of the hose or pipe and a cross part connecting the extensions, wedging members each comprising narrow parts between the loop member extensions and lateral parts extending along the hose or pipe between the end parts of the loop member, one of said wedging members straddling the hose or pipe with its narrow end parts lapping partly around the hose or pipe, and the other wedging member, resting on the aforementioned wedging member and having depressions in which the cross parts of the loop member engage.

7. In a hose or pipe clamp, a loop member to extend around the hose or pipe, having end parts each composed of extensions from the opposite sides of the hose or pipe and a cross part connecting the extensions, wedging members each comprising narrow parts between the loop member extensions and lateral parts extending along the hose or pipe between the end parts of the loop member, and having registering channels in their meeting sides, from end to end, one of said wedging members straddling the hose or pipe with its narrow end parts lapping partly around the hose or pipe, and the other wedging member, resting on the aforementioned wedging member and having depressions in which the cross parts of the loop member engage, and a bolt extending through the registering channels and holding said members together in their wedging relation.

8. In a hose or pipe clamp, a wedging member comprising a middle part with a channel from end to end, narrow end parts adapted to lap partly around a hose or pipe, and lateral extensions to lie along the hose or pipe, the surfaces of said member at the sides of the channel and throughout said lateral extensions being flat and inclined in a single plane, and means coacting with said member, including a loop to surround the hose or pipe, to clamp said hose or pipe.

9. In a hose or pipe clamp, a wedging member comprising a lower curved portion to straddle a hose or pipe, and an upper inclined portion, another wedging member received by said inclined portion, and means coacting with said members, including a loop to surround the hose or pipe, to clamp said hose or pipe.

10. In a hose or pipe clamp, a wedging member comprising a lower curved portion to straddle a hose or pipe, and an upper inclined portion, another wedging member received on said inclined portion, said upper portion having a channel at an angle to the inclination of said portion, a bolt in said channel, wedging said members together, and a loop tightened around a hose or pipe by said members when wedged together.

11. In a hose or pipe clamp, a wedging member comprising a middle part having a channel from end to end, in its lower side, and having depressions in its upper side, and means coacting with said member, including a loop engaging in said depressions and surrounding the hose or pipe, and a bolt in said channel, to clamp said hose or pipe.

12. In a hose or pipe clamp, a wedging member comprising a middle part having a channel from end to end, in its lower side, having depressions in its upper side, and having lateral extensions from its region between said depressions, and means coacting with said member, including a loop engaging in said depressions and surrounding the hose or pipe, and a bolt in said channel, to clamp said hose or pipe.

13. In a hose or pipe clamp, wedging means comprising a member to lie against the hose or pipe and a member to lie on the aforementioned member, said members having registering channels from end to end, at an angle to their meeting surfaces, and means coacting with said wedging means, including a loop to surround the hose or pipe and a bolt in said channel to wedge said members together, to clamp the hose or pipe.

ALPHEUS FAY.
JOHN L. ZEHNDER.